United States Patent Office 2,924,813
Patented Feb. 9, 1960

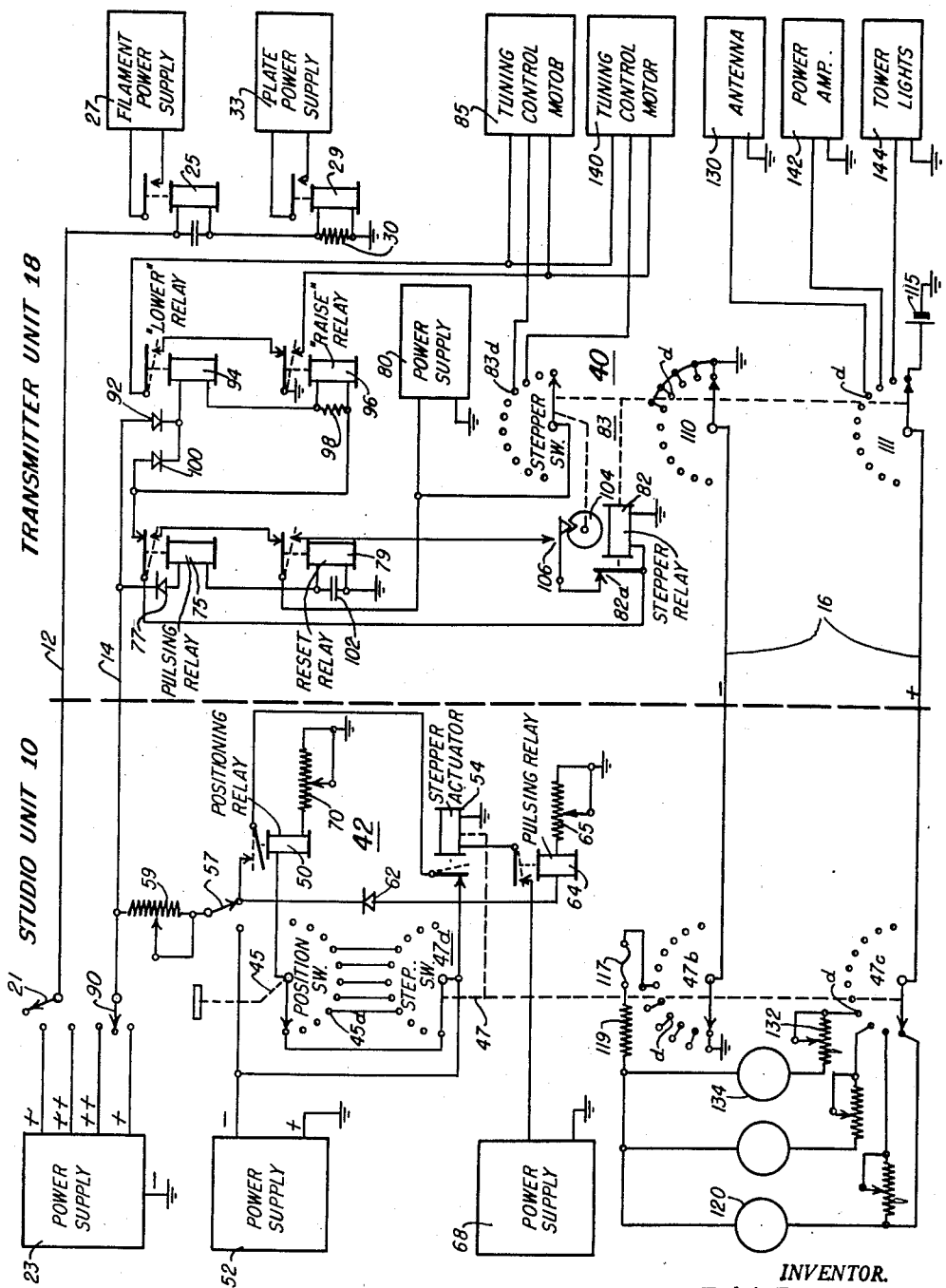

2,924,813

REMOTE CONTROL SYSTEM

Ralph E. Meador, Quincy, Ill., assignor to Gates Radio Company, Quincy, Ill., a corporation of Illinois Application March 6, 1956, Serial No. 569,850

10 Claims. (Cl. 340—163)

This invention relates generally to remote control apparatus and more particularly to such apparatus of the type which may be used for control and supervision of electronic equipment, for example, radio transmitters.

Many of the present day broadcasting studios are remotely located from the actual transmitting equipment. Since there are various adjustments and measurements necessary to insure proper operation of the transmitter it is generally required that an operator be present at the equipment for such purposes. It is also possible, however, to employ remote control apparatus so that many of the transmitter adjustments may be carried out from the studio. Control equipment of this general type is shown in the copending application of Wallace J. Kabrick, filed April 23, 1954, under Serial Number 425,293, now abandoned, and assigned to the assignee of the present invention. Such control apparatus may include provision for energizing the transmitter as well as for operating suitable motors to regulate adjustable elements in various circuits of the transmitter. Of course, supervision or metering of any adjustments which are made should also be available so that the exact effect of any adjustment made in the circuit can be observed.

It is an object of this invention to provide remote control apparatus for electronic equipment to perform extensive control and supervision through use of a minimum of intercoupling channels between the control and controlled points.

A further object of the invention is to provide simple and reliable remote circuit selecting apparatus and return metering instruments operating therewith for indicating the condition of circuits selected.

A feature of the invention is the provision of an improved remote control and selector system including polarized relays connected to a communication channel, one of the relays being controlled by electrical pulses to connect one of a plurality of circuits to a metering channel and an additional pair of relays being selectively controlled by different quantities of current over such channel to operate motors for the purpose of adjusting circuits to be metered. A combination of interlocked contacts and a rectifier network for the pulse and motor control relays furnishes selective operation of these relays and prevents false operation thereof.

Another feature of the invention is the provision of apparatus for remote selection of a circuit to be controlled and metered including a local unit having a multi-position selector switch and a stepping switch connected in a pulsing circuit which operates the stepping switch until it corresponds to the position of the selector switch, and provides pulses to a remote stepping switch which is operated in synchronism with the local stepping switch by a polarized relay and adapted to select a circuit to be controlled from the local position by a further polarized relay.

Additional objects, features, and the attending advantages of these will be apparent upon consideration of the following description when taken in conjunction with the accompanying drawing in which the single figure is a schematic and block diagram of a studio control system for a transmitter which incorporates the invention.

Briefly, this invention provides apparatus for control and supervision of electronic equipment from a remote position. In a preferred form thereof a remote broadcast radio transmitter is controlled, adjusted, and metered from a local studio. Relays operable by different amounts of current are energizable over one channel for controlling power applied to the transmitter. At the studio a position selection switch and associated stepping switch are coupled in a pulsing circuit so as to provide operation of the stepping switch until the position of this switch and the position selector switch coincide, and to provide pulses over a second channel to a polarized relay used for circuit selection. A pair of polarized, current selective relays operated by different amounts of current, are used for regulating reversible control motors to adjust variable elements in the circuits selected. A set of contacts of the pulse operated relay prevents undesired or false operation of the current selective, polarized relays and a diode network provides polarization of the relays on the further channel in addition to preventing false operation of the pulse operated relay due to energy storage in the current selective, polarized relays. A third channel between the transmitter and studio is used for a metering circuit so that the condition of a given circuit at the transmitter may be observed while adjustments thereof are made.

In the drawing there is shown a local or studio unit 10 which is intercoupled over channels or connecting lines 12, 14 and 16 to the remote or transmitter unit 18. Line 12 is used to control the filament and high voltage supplies of the transmitter unit, that is for the energization of the transmitter. Line 14 is used in the selection of various adjustable circuits at the transmitter and in the control of motors which may be used in remotely adjusting such circuits. Line 16 is used for the return metering circuit so that adjustments made in the transmitter circuits may be observed at the studio location.

Switch 21 at the studio unit is movable to a first position which couples a low potential to line 12 from the power supply 23. This potential is sufficient to cause energization of relay 25 at the transmitter unit which closes contacts associated therewith and operates the filament power supply 27 to energize the filaments of various electron tubes (not shown) as used in the transmitter. The amount of current necessary to energize relay 25 is insufficient to energize relay 29 across which a current dividing resistor 30 is connected. During practical operation of the system an operator moves switch 21 to its first position and energizes the filaments of the transmitter. After a given warm up time switch 21 is moved to a second position which applies a higher potential to line 12 from power supply 23 and causes sufficient current to flow in the line to energize relays 25 and 29 and close contacts associated therewith to energize plate power supply 33 as well as the filament supply 27. This supplies the various direct current voltages to the transmitter circuit (not shown) so that the transmitter is fully operative, and is in a condition to send signals suitably modulated by intelligence from studio unit 10, the circuitry for which is not shown since the invention is not concerned with that portion of the equipment.

During use of the transmitter, it sometimes becomes desirable or necessary to retune or adjust certain of its circuits. In order to do this from the local or studio unit 10, the particular circuit to be regulated is selected by means of a stepping switch 40 provided at the remote or transmitter unit. Switch 40 is operated by means of a pulsing circuit 42 at the local unit. A given transmitter circuit is selected for the control operation by adjusting the multi-position selector switch 45 at the local unit.

Selector switch 45 cooperates with stepping switch 47 at the local unit. The fixed contacts of switch 45 are individually connected to the fixed contacts of the level 47a of stepping switch 47. The actuator 54 of the stepping switch 47 is energized by pulsing relay 64 which is in turn energized through relay 50. Relay 50 is energized through the interconnected contacts of selector switch 45 and level 47a of stepping switch 47. When switch 45 is moved to a position out of correspondence with the position of stepper switch 47, relay 50 will be de-energized thus closing its contacts and applying a negative potential from power supply 52 through closed contacts of the stepping switch actuator 54, the contacts of relay 50, contacts of reset switch 57 and a portion of variable resistor 59 to the line 14. This applies a negative pulse to the transmitter unit as will be more fully explained.

The negative pulse is also applied through the closed contacts of relay 50 and diode 62 to pulsing relay 64. The other terminal of this relay is connected to a ground return through current adjusting resistor 65. Accordingly relay 64 will energize and the closed contacts thereof will apply a potential from power supply 68 to stepping switch actuator 54. Actuator 54 is then energized which opens the contacts thereof to break the circuit from power supply 52. At this time, of course, the potential is no longer applied to line 14 nor to pulsing relay 64 and this relay releases. The contacts of actuator 54 again close and stepper switch 47 is advanced one step. This sequence continues until stepping switch 47 is in a position which corresponds to the position of switch 45. At this time a potential from power supply 52 is applied through level 47a of stepper switch 47 and through selector switch 45 to positioning relay 50, a ground return for which is provided through current limiting resistor 70. When relay 50 is energized a potential from supply 52 is no longer applied to line 14 nor to pulsing relay 64 and the system is at rest. Thus it may be seen that selector switch 45 may be adjusted to any one of its positions and that stepping switch 47 will follow until its position corresponds to that of switch 45. Furthermore, as indicated above, each time the pulsing circuit 42 produces a pulse for movement of stepping switch 47, a negative voltage pulse (with respect to ground) is applied through line 14 to the transmitter unit.

At the transmitter unit 18, pulsing relay 75 is serially connected to line 14 through diode 77. A ground return for relay 75 is provided through reset relay 79. Diode 77 is polarized so as to conduct current caused by negative going pulses and upon reception of each pulse from studio unit 10, the contacts of relay 75 are established in the dotted position to apply an operating potential from power supply 80 through the solid line contacts of relay 79 to the stepping switch actuator 82. Actuator 82 operates stepping switch 40 and it is obvious that this switch will follow the movements of stepping switch 47 according to the pulses received at the transmitter. In the specific connection illustrated level 83 of switch 40 will establish contact 83d and complete an energizing circuit from power supply 80 to tuning control motor 85. Motor 85 is of the reversible type and may be rendered operative to turn any desired adjustable circuit element at the transmitter by grounding either of the remaining leads thereof, the choice of which determines the direction of rotation of the motor.

In order to operate motor 85 from the remote, or studio position, control switch 90 may be operated. Moving switch 90 in the downward direction applies a low positive potential to line 14, the current from which may be conducted by diode 92 but not diode 77. "Lower" relay 94 is serially connected with diode 92 and current flow at the low potential from power supply 23 is sufficient to energize this relay. A ground return for relay 94 is provided through "raise" relay 96, the solid contacts of relay 75, and stepper relay 82. It may be noted at this time that if relay 75 is in operation, and its contacts open, relay 94 may not be energized thus insuring that stepping switch 40 will have reached a position of rest before a circuit adjustment may be made at the transmitter. When "lower" relay 94 is energized its contacts will be closed to apply a ground return to the upper connection of tuning control motor 85 through the solid line contacts of relay 96 which are established in the released condition of this relay. Accordingly, through operation of switch 90 motor 85 is energized by power supply 80 to turn some variable component at the transmitter in a given direction, that is, to lower the setting of this component. To raise the setting of such a component, switch 90 is moved to its upward position thus causing a high positive potential from power supply 23 to be applied to line 14 and then increasing the current flow through relays 94 and 96 to a point which is sufficient to cause energization of relay 96. This relay is shunted by current dividing resistor 98 so that such increased current will be necessary before it will actually become energized to move its contact arm. Under these conditions relay 94 will also be energized but the contacts of relay 96 will be moved to the dotted line position thus completing a ground return to the lower lead of motor 85 and opening the circuit providing a ground return for the upper lead to motor 85. Therefore, the tuning control motor will be operated in the opposite direction to raise the setting of the component which it drives.

Relays 94 and 96 are shunted by a diode 100 which is connected in a polarity opposite to that of diode 92, that is, in a back to back relation therewith so that when switch 90 is returned to a neutral or open position any energy stored in the coils of relays 94, 96, that is any self induced current, will be released as current flow which is shorted through diode 100. Without this provision, sufficient self induced current could be conducted back through diodes 92 and 77 to cause false operation of pulsing relay 75 and incorrect synchronization of stepper switch 40 with switch 47.

In order to reset stepping switches 40 and 47, as well as to insure synchronization of these switches, should this be desirable, a reset switch 57 is provided at the studio unit. When this switch is moved to the left a negative potential from power supply 52 is applied directly to line 14 through the current adjusting resistor 59. This current of course is of the incorrect polarity to cause operation of relays 94 or 96 but is of the proper polarity to cause energization of relays 75 and 79. That is, if switch 57 is maintained in its left position, current may flow for sufficient time to charge capacitor 102, which shunts relay 79, and permits energization of this relay thus moving its contacts to the dotted position. Whenever stepping switch 40 has moved from its home position (as shown), rotatable member 104, which is movable with the rotating arms of switch 40, closes the contacts of switch 106. Therefore, with relay 79 energized, a circuit is completed from power supply 80 through the contacts of switch 106 and the contacts 82a of stepper relay 82 to this relay. Contacts 82a are, of course, immediately opened causing switch 40 to be moved one step and causing de-energization of relay 82 so that contacts 82a are again closed. This pulsing action continues until member 104 is rotated to the home position at which time contacts of switch 106 are open (as shown) and the circuit is broken. During the circuit selection operation when the negative going pulses are applied to relay 79, this relay does not become energized since capacitor 102 is made large enough to cause effective short circuiting of relay 79 for the time duration of the pulses utilized in the system. At the studio unit 10, stepper switch 47 is returned to its home position by a mere adjustment of the position switch 45 to the home position as shown. This may be done prior to the time that reset switch 57 is operated to insure that both stepping switches 40 and 47 are in known and synchronized positions.

It may also be seen that stepping switch 47 includes further sections 47b and 47c which may be established in various positions corresponding to those of section a of this switch. Furthermore, stepping switch 40 includes additional levels or sections 110 and 111 which are similar to section 83 of this switch. In the positions of switches 40, 47 as shown, that is, in the home positions thereof, a standard cell 115 is connected across line 16 through fuse 117 and line balancing resistor 119 to meter 120. Accordingly, in this condition of the apparatus, the remote metering system may be tested to check proper operation thereof. However, as the stepping switches are moved to their various other positions, different metering circuits at the transmitter unit 18 are coupled across the line 16 and to the meters at the studio unit 10 so that as the control motors are operated the condition of the circuit being adjusted may be observed. For example, with stepping switch sections 110 and 111 in the d position and with stepping switch section 47b and 47c in corresponding positions, the antenna metering circuit 130 will be coupled across line 16 and through calibrating resistor 132 to meter 134 so that as tuning control motor 85 is adjusted through operation of switch 90 an operator is aware of the changes he is making in the circuit. It is believed obvious to those skilled in the art that various other tuning control motors such as motor 140 may be added to control any desired component at the transmitter and that various additional metering circuits may be provided such as a power amplifier metering circuit 142 and an antenna tower light metering circuit 144 in order to permit supervision of whatever circuit is controlled at the transmitter or merely to permit observation of the current flow in a circuit even if there is no adjustable provision for the circuit.

This invention furnishes, therefore, remote control apparatus for a wave signal transmitter or other similar electronic equipment. The apparatus is of the type affording sufficient control and supervision so that it is unnecessary for an operator to be in attendance at the remote position. Furthermore, this control is obtained through the use of a minimum of intercoupling channels between the local and remote points and the apparatus is of comparatively simple construction. The remote control system provides several separate control operations over but a few communicating channels but yet includes circuits which are effectively isolated from one another so as to prevent false or undesired operation of the system.

I claim:

1. Apparatus for remote selection and control of electronic circuits over a control channel, including in combination, a control station having pulse producing means for applying a plurality of current pulses of first polarity to the control channel and power supply means for applying current of second polarity and first and second amounts to the control channel, and a controlled station including a plurality of control means for adjusting different circuits, first polarized relay means coupled to the control channel and operable by current pulses of said first polarity, a stepping switch operated by said first relay means for selecting one of said control means to adjust a desired circuit, second and third relay means series coupled to the control channel and polarized oppositely to said first relay means, said second relay means being operable by current of first amount and said second and third relay means being operable by current of second amount, said control means being operable in different modes by operation of said second relay means singly and said second and third relay means together for adjustment of the desired circuit.

2. Apparatus for remote selection and control of equipment over a control channel, including in combination, a control station having first means for applying current pulses of first polarity to the control channel and second means for applying current of second polarity and first and second amounts to the control channel, and a controlled station including first polarized relay means coupled to the control channel and operable by the current pulses of first polarity, second and third relay means series coupled to the control channel and polarized oppositely to said first relay means, said second relay means being operable by current of first amount and said second and third relay means being operable by current of second amount, a rectifier coupled across said second and third relay means with a polarity opposite to the polarization thereof to provide a return path for self induced current therein and to prevent false operation of said first relay means, control means coupled to said second and third relay means, said control means being operable in different modes by operation of said second relay means singly and by operation of said second and third relay means together for adjustment of the equipment at the controlled station, and a stepping switch operable by said first relay means for rendering said control means responsive to operation of said second and third relay means.

3. Apparatus for remote control and metering of electronic equipment over first and second control channels, including in combination, a control station having indicating means adapted to be coupled to the first control channel, pulse producing means for applying current pulses of first polarity to the second control channel, and power supply means for applying steady current of first polarity to the second control channel and for applying steady current of second polarity and different amounts to the second control channel; and a controlled station including first and second rectifiers, first and second relays serially coupled to the second control channel through said first rectifier arranged to conduct pulses and steady currents of first polarity, said first relay being responsive to pulses and said second relay being responsive to steady current, third and fourth current selective relays serially coupled to the second control channel through said second rectifier arranged to conduct steady current of said second polarity, a further rectifier coupled across said third and fourth relays in opposite polarity to the connection of said second rectifier to provide a path for self induced currents in said third and fourth relays, metering circuit means for indicating the condition of the equipment at the controlled station, a stepping switch operable by said first relay and adapted to be reset by said second relay, and control means operable by said third and fourth relays for adjustment of the equipment at the controlled station, said stepping switch having contacts for coupling said metering circuit means to said first control channel and for rendering said control means responsive to said third and fourth relays so that operation of said pulse producing means selects equipment controlled by operation of said power supply means and metered by said indicating means.

4. Apparatus for remote control and metering of electronic equipment over first, second and third control channels, including in combination, a control station having indicating means adapted to be coupled to the first control channel, pulse producing means for applying current pulses of first polarity to the second control channel, first power supply means for applying steady current of second polarity and different amounts to the second control channel and second power supply means for applying current of different amounts to said third channel; and a controlled station including first and second rectifiers, a first relay serially coupled to the second control channel through said first rectifier arranged to conduct said pulses of first polarity, second and third current selective relays serially coupled to the second control channel through said second rectifier arranged to conduct steady current of said second polarity, a further rectifier coupled across said second and third relays in opposite polarity to the connection of said second rectifier to provide a path for self induced currents in said second and third relays, fourth and fifth current selective relays coupled to the third control channel and operative by said second power supply means for energizing equipment at the controlled station, metering circuit means for indicating the condition of the equipment at the controlled station, a stepping switch operable by said first relay, and control means operable by said second and third relays for adjustment of the equipment at the controlled station, said stepping switch having contacts for coupling said metering circuit means to said first control channel and for rendering said control means responsive to said second and third relays so that operation of said pulse producing means selects equipment controlled by operation of said first power supply means and metered by said indicating means.

5. Apparatus for remote selection and control of electronic circuits over a control channel, including in combination, a control station having pulse producing means for applying current pulses of first polarity to the control channel, power supply means for applying current of first polarity to the control channel and for applying current of second polarity to the control channel, and a rectifier coupling said pulse producing means to the control channel and poled to oppose the current of second polarity; and a controlled station including first and second rectifiers, first and second relay means coupled to the control channel through said first rectifier and arranged to conduct current of first polarity, said first relay means being responsive to pulses and said second relay means being responsive to steady current and unresponsive to pulses, third relay means coupled to the control channel through said second rectifier and arranged to conduct the current of second polarity, control means controlled by said third relay means for adjustment of the equipment at the controlled station, and a stepping switch operable by said first relay means for rendering said control means responsive to operation of said third relay means, said stepping switch having means responsive to said second relay means for resetting the same to a predetermined position.

6. Apparatus for remote selection and control of electronic circuits over a control channel, including in combination, a control station having first means for applying current pulses of first polarity to the control channel and second means for applying current of second polarity and different voltage levels to the control channel, and a controlled station including a first polarized relay circuit coupled to the control channel and operable by the current pulses of first polarity to select a desired circuit with the circuit selected depending upon the number of current pulses, a second relay circuit polarized oppositely to said first relay circuit and coupled to the control channel, said second relay circuit including a pair of relays selectively responsive to the different levels of current of second polarity, and control means controlled by said pair of relays, said control means being operable in different modes corresponding to the different responses of said pair of relays.

7. Apparatus for remote control of equipment over a control channel, including in combination, a control station having means for applying current of first polarity to the control channel and means for applying current of second polarity and first and second voltage levels to the control channel, and a controlled station including first and second relay circuits coupled to the control channel, rectifier means polarizing said first relay circuit to selectively conduct the current of first polarity and polarizing said second relay circuit to selectively conduct the current of second polarity, a pair of relays in said second relay circuit, one of said relays being selectively operable by the current of second polarity at the first voltage level and said relays being operable together by such current at the second voltage level, and control means operable in different modes by said pair of relays depending on the response thereof for adjusting the equipment at the controlled station.

8. Apparatus for remotely controlling equipment over a control channel and for remotely metering the equipment over a metering channel, including in combination, a control station having indicating means adapted to be coupled to the metering channel, means for applying current pulses and steady current of first polarity to the control channel and means for applying current of second polarity and first and second voltage levels to the control channel, and a controlled station including a plurality of control means operable in different modes for adjusting different portions of the equipment, a plurality of metering circuits for connection to the equipment, a first relay circuit coupled to the control channel and polarized to selectively conduct current of first polarity, said first relay circuit including a pulsing relay selectively operable by the current pulses of first polarity and a reset relay operable by the steady current of first polarity and unresponsive to pulses, a stepping switch operated by said pulsing relay and said reset relay for selecting one of said control means to make a desired adjustment of the equipment and for coupling a corresponding one of said metering circuits to the metering channel, a second relay circuit coupled to the control channel and polarized to selectively conduct current of second polarity, said second relay circuit including a pair of relays for operating said control means in different modes, one of said pair of relays being selectively operable by the current of second polarity at the first voltage level to operate said control means in one mode and said pair of relays being operable together by such current at the second voltage level to operate said control means in another mode.

9. Apparatus for remote selection, control and metering of equipment over first, second and third channels, including in combination, a control station having indicating means coupled to the first channel, pulse producing means for applying current pulses of first polarity to the second channel, power supply means for applying current of second polarity and different voltage levels to the second channel and for applying current of different voltage levels to the third channel; and a controlled station including a plurality of control means for controlling the equipment, a plurality of metering circuits for connection to the first channel, a first relay circuit including a pulsing relay coupled to the second channel and polarized to selectively conduct the pulses of first polarity, a stepping switch operated by said pulsing relay for selecting one of said control means and one of said metering circuits with the selection depending on the number of pulses, a second relay circuit coupled to the second channel and polarized to selectively conduct the current of second polarity, said second relay circuit including a pair of relays selectively responsive to the different levels of current of second polarity applied to the second channel for controlling in different modes the control means selected by said stepping switch, a third relay circuit coupled to the third channel, said third relay circuit including another pair of relays selectively responsive to the different levels of current applied to the third channel for energizing equipment at the controlled station, said selected metering circuit indicating on said indicating means at said control station the condition of the equipment at the controlled station.

10. Apparatus for remote selection and control of equipment over a control channel, including in combination, a control station having first means for applying a plurality of current pulses of first polarity to the control channel, said first means including a first power supply, a positioning relay having normally closed contacts for applying the pulses to said channel, a manually operable switch having a movable contact coupled to said positioning relay and a plurality of fixed contacts, a positioning stepper switch having a plurality of fixed contacts individually coupled to the contacts of said manually operable switch and a movable contact connected to said first power supply so that the contacts of said positioning relay are open when the established contacts of said manually operable switch and said stepper switch correspond, and a pulser relay coupled to said control channel and energizable by pulses therefrom, said pulser relay having contacts coupled to said power supply and to said stepper switch for applying an energizing potential to said stepper relay, and a second power supply for applying current of second polarity and first and second voltage levels to the control channel; said apparatus further including a controlled station having a first relay circuit coupled to the control channel and polarized to selectively conduct current of first polarity, said first relay circuit including a pulsing relay operable by the current pulses of first polarity, a stepping switch operable by said pulsing relay for selecting a desired portion of the equipment for adjustment, a second relay circuit coupled to the control channel and polarized to selectively conduct current of second polarity, said second relay circuit including a pair of relays with one of the same being operable singly by the current of second polarity at the first voltage level and with said pair of relays being operable together by the current of second polarity at the second voltage level, and control means coupled to said pair of relays and operable thereby in different modes by operation of said pair of relays singly and together for adjustment of the selected portion of the equipment.

References Cited in the file of this patent

UNITED STATES PATENTS

| | | |
|---|---|---|
| 386,189 | Delany | July 17, 1888 |
| 1,600,353 | Puckette | Sept. 21, 1926 |
| 1,704,736 | Geiger | Mar. 12, 1929 |
| 1,801,827 | Wensley | Apr. 21, 1931 |
| 2,059,896 | Oliver | Nov. 3, 1936 |
| 2,230,859 | Blake | Feb. 4, 1941 |